United States Patent [19]
Karlsson

[11] 3,938,380
[45] Feb. 17, 1976

[54] HYDRAULIC LOAD SENSING DEVICE

[76] Inventor: Einar Karlsson, 5 Vinkelgatan, Burtrask, Sweden, S-930 20

[22] Filed: July 10, 1974

[21] Appl. No.: 487,162

[30] Foreign Application Priority Data
July 12, 1973 Sweden .............................. 7309779

[52] U.S. Cl. ................................ 73/141 R; 177/208
[51] Int. Cl.² ........................................... G01L 1/02
[58] Field of Search........... 73/141 R, 392; 177/147, 177/208

[56] References Cited
UNITED STATES PATENTS

| | | | |
|---|---|---|---|
| 669,391 | 3/1901 | Hillenbrand | 73/392 |
| 1,997,864 | 4/1935 | Hill | 177/147 X |
| 2,620,177 | 12/1952 | Wise | 177/208 |
| 2,851,171 | 9/1958 | Martin et al. | 177/147 X |
| 3,074,272 | 1/1963 | Melton et al. | 73/141 R |
| 3,376,739 | 4/1968 | Thornton | 73/141 R |
| 3,752,245 | 8/1973 | Johnson | 177/208 |

Primary Examiner—Charles A. Ruehl
Attorney, Agent, or Firm—Pierce, Scheffler & Parker

[57] ABSTRACT

A hydraulic load-sensing device disposed between a load carrying device in the form of a lifting hook and a hoist in the form of a crane jib includes a single-acting hydraulic piston and cylinder unit, the cylinder component being connected to the hoist jib and the piston component being connected to the lifting hook in such manner that as the hoist jib is raised in order to raise the load carried by the hook, a corresponding pressure is exerted on the hydraulic medium between the piston and the lower end of the cylinder and this pressure is transmitted from the cylinder through a line to a pressure gage which measures and exhibits the combined dead weight of the hook and its load.

2 Claims, 1 Drawing Figure

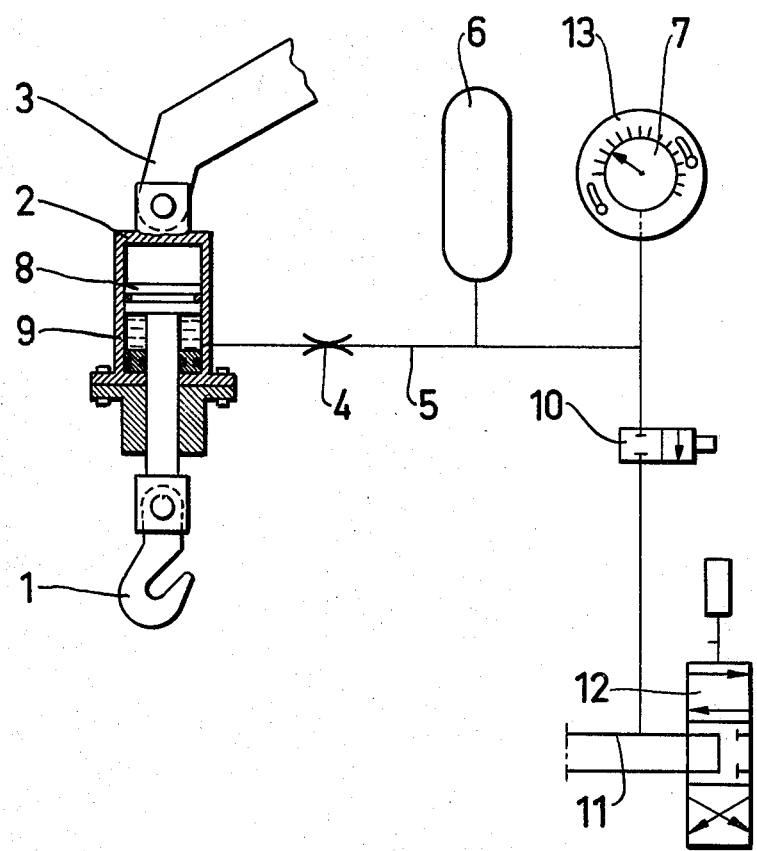

HYDRAULIC LOAD SENSING DEVICE

This invention relates to a hydraulic device for sensing a load or weight, preferably in connection with the loading of vehicles by means of a hoisting apparatus, for example a crane with a load carrier, e.g. a lifting hook. The invention, however, is not restricted to the loading of transport vehicles, but can be applied at any kind of hoisting means, e.g. hoist blocks, overhead traveling cranes and similar means.

Existing regulations concerning the excess weight of road haulage vehicles have created a great problem in the road haulage business, viz. to be able to determine with sufficient accuracy the weight of the freight without the use of an equipment being too expensive and complicated. The present invention, therefore, has the object to solve this problem and, thus, produce a load weighing device, which is substantially cheaper and less complicated than the known load weighing devices, and which at the same time provides a measuring result, which is sufficiently accurate for this object, so that there is no risk of excess load when the measuring result stays within the permissible limits.

This object is achieved by the device according to the invention showing the characterizing features defined in the claims.

The invention is defined in greater detail in the following, with reference to the accompanying drawing, which shows the weighting device according to the invention suspended on a crane jib.

The drawing shows a weight sensing device 2 disposed between a load carrier 1, which at this embodiment is designed as a lifting hook, and a hoisting means 3, which is shown in the form of a crane jib. The weight sensing device 2 consists of a single-acting piston and cylinder means, the cylinder 9 of which is pivotally suspended on the jib 3, and the piston fluid 8 of which carries pivotally the lifting hook 1 and rests on a fluid chsion enclosed by the cylinder and being a hydraulic medium in a closed system, which in addition to said piston comprises a hydraulic accumulator 6, a pressure gage 7 with a rotary dial 13 to be set with respect to the dead weight of the load carrier, and a throttle valve 4 disposed in the conduit 5 leading to the cylinder 9. This closed system is connected for filling and draining via a stop valve 10 to the ordinary hydraulic system 11 of the hoisting means which includes a valve 12.

When a load is attached to the load carrier 1, it is transferred to the movable part of the piston-cylinder means, i.e. to the piston 8. Hereby the pressure in the cylinder increases and hydraulic medium is pressed out through the throttle valve 4 in the conduit 5, which communicates with the hydraulic accumulator 6 or a similar equipment and the pressure gage 7, which indicates the hydraulic pressure in the system at any occasion. When the hydraulic medium passes through the throttle valve 4, heat is generated therein and at the same time the movement of the hydraulic medium to the hydraulic accumulator 6 is braked. When the pressure of the hydraulic medium in the hydraulic accumulator 6 is equal to that in the weight sensing device, the movement of the pressure medium is stopped, and the weight of the load suspended on the load carrier 1 can be read from the pressure gage 7, which in this position shows by the position of the pointer on deal 13 a weight being in close agreement with the real weight, due to the fact that the pressure medium, and thereby the piston in the sensing body, i.e. weight sensing device, is moving and the friction between the piston 8 and cylinder wall 9 is held as motion friction until a pressure has been achieved which is very close to the pressure corresponding to the weight of the load.

When weighing at low temperature, the temperature of the pressure medium increases, and thereby the friction decreases due to the heat, which is generated in the throttle valve 4 and transferred both to the hydraulic accumulator 6 and to the weight sensing device 2. This implies that the total result at repeated weighings will be accurate.

When hydraulic medium is to be filled in or drained off, due to a change in volume which may arise by temperature variation or leakage, the valve 10 is opened. Thereby hydraulic medium can flow into the weighing system from the hydraulic system 11 of the crane when the valve 12 on the crane is in an end position, and, respectively, flow out from the weighing system when the valve 12 is in neutral position.

By means of the embodiment of the device for load or weight sensing shown in the drawing in the form of a hydraulic scale, the weight of the load can be obtained with very high accuracy, even when compared to known hydraulic load weighing means of the vehicle-borne kind, and independently of temperature variations affecting the volume and viscosity of the hydraulic medium. The device at the same time is sufficiently simple to be used economically as crane accessory or the like.

I claim:

1. An hydraulic load-sensing arrangement interposed between a load carrying device and a hoisting device which is comprised of a hydraulic piston and cylinder unit, said cylinder being secured to said hoisting device and said load carrying device being secured directly to the piston rod which extends through the lower end of said cylinder thereby effecting an application of pressure to the hydraulic medium located between the piston and cylinder proportional to the weight of the load, and conduit means including a throttling point connecting the hydraulic medium within said cylinder to a closed hydraulic system including an accumulator and a pressure gage.

2. An hydraulic load-sensing arrangement as defined in claim 1 wherein said hoisting device is of the hydraulic type and which further includes conduit means for connecting said closed hydraulic system to the hydraulic system for said hoisting device through a stop valve.

* * * * *